United States Patent [19]

Meyers

[11] 3,841,289

[45] Oct. 15, 1974

[54] ENGINE CYLINDER HEAD GASKET

[75] Inventor: Willis G. Meyers, Madison Heights, Mich.

[73] Assignee: General Motors Corporation, Detroit, Mich.

[22] Filed: Feb. 20, 1973

[21] Appl. No.: 334,044

[52] U.S. Cl. ....... 123/193 CH, 277/233, 277/235 B
[51] Int. Cl. .......................... F02f 11/00, F16j 11/02
[58] Field of Search... 277/235 B, 166, 233, DIG. 6, 277/180, 230; 123/193 CH

[56] References Cited
UNITED STATES PATENTS

| | | | |
|---|---|---|---|
| 1,932,538 | 10/1933 | Sutcliffe | 277/235 B X |
| 2,055,471 | 9/1936 | Balfe | 277/235 B |

FOREIGN PATENTS OR APPLICATIONS

| | | | |
|---|---|---|---|
| 955,215 | 4/1964 | Great Britain | 277/235 B |
| 465,371 | 5/1937 | Great Britain | 123/193 CH |

OTHER PUBLICATIONS

Handbook of Material Trade Names, Supplement IV, Industrial Research Service, 1965, p. 140.

*Primary Examiner*—Charles J. Myhre
*Assistant Examiner*—W. H. Rutledge, Jr.
*Attorney, Agent, or Firm*—Robert J. Outland

[57] ABSTRACT

An internal combustion engine is provided with a composite cylinder head gasket formed from a metal sheet coated on either side with sheet graphite having less than maximum density. In preferred embodiments, the thickness of the gasket is slightly greater in annular sealing areas adjacent the cylinder bore openings than over the remainder of the gasket so that tightening down of the cylinder head on the block will compress the graphite material adjacent the cylinder bores to substantially its maximum density so it will withstand variable cylinder pressures and temperatures while the remainder of the graphite material is compressed to a lesser degree to limit the required clamping load on the gasket while adequately sealing coolant and oil passages.

7 Claims, 5 Drawing Figures

PATENTED OCT 15 1974 3,841,289

ENGINE CYLINDER HEAD GASKET

BACKGROUND OF THE INVENTION

This invention relates to internal combustion engines and, more particularly, to cylinder head gaskets for sealing the joint between the cylinder head and block of such engines.

Many materials and combinations of materials in various configurations have been utilized in the making of cylinder head gaskets for internal combustion engines. However, the increasingly severe operating conditions for such engines, particularly high compression engines of the diesel type, and the desire for increasingly longer maintenance-free service lives has prompted a continuing search for improved materials and configurations. Initial attempts to utilize graphite laminate of about 70 percent maximum density as a gasket for a diesel engine cylinder head resulted in failure of the gasket at the edges of the cylinder bore openings. Study suggested a mechanism for the failures involving cyclic infiltration of of the porous edges of the graphite by the variable temperature (ambient to 4,000° F.) and pressure (below ambient to 2,500 psi) highly oxidizing combustion gases which erodes away the exposed edges of the graphite until failure occurs.

SUMMARY OF THE INVENTION

The present invention provides high performance extended life cylinder head gaskets for internal combustion engines, including diesel engines, utilizing novel combinations of materials and configurations, which, when installed in engines, yield engine assemblies capable of high performance with extended operating times.

The invention comtemplates use of a known non-densified graphite material as a sealing agent for the cylinder bores and the various oil and coolant passages extending through the opposing faces of the cylinder head and block. The graphite material is preferably provided as a laminated sheet coating cemented or otherwise applied on a metal support sheet. Various arrangements are contemplated for differentially compressing the graphite material in assembly so that the annular portion around the cylinder bores is compressed to substantially its maximum density, while the remainder of the graphite material is subjected to less compression. The maximum compression around the cylinder bores permits the graphite material to withstand the high pressures and temperatures in the cylinders without burning or erosion. The lesser compression of the material around the coolant and oil passages provides satisfactory sealing at these locations and permits the total clamping load on the cylinder head to be maintained within reasonable limits.

These and other features and advantages of the invention will be more fully understood from the following description of certain preferred embodiments, taken together with the accompanying drawings.

DESCRIPTION OF THE ILLUSTRATED EMBODIMENT

Figure 1:
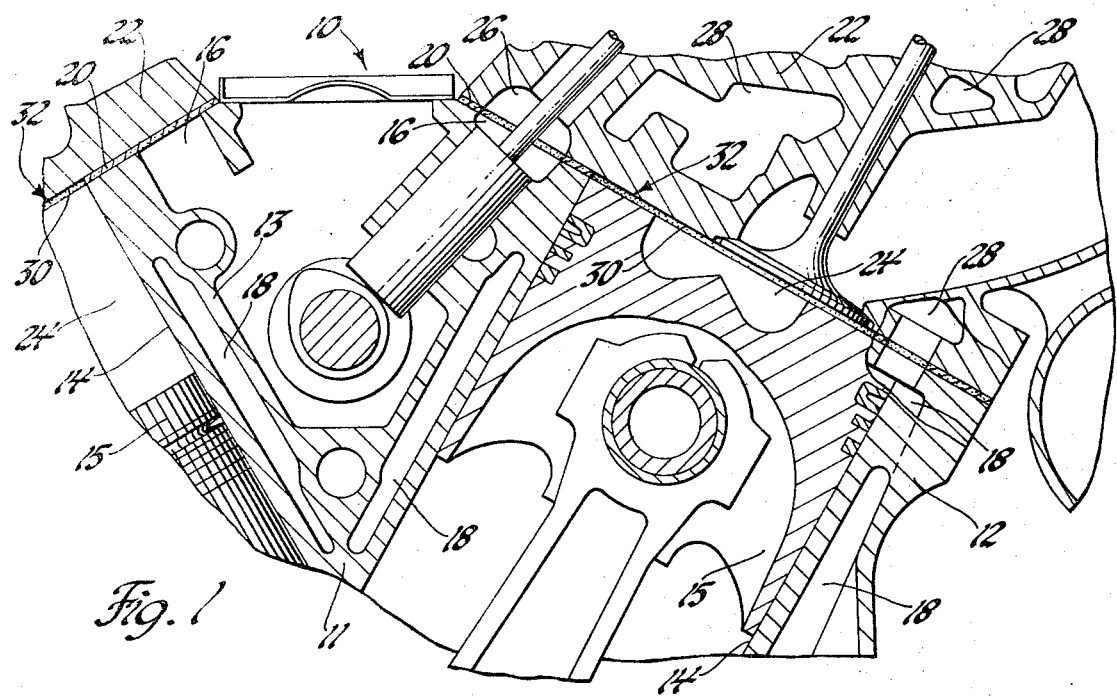
FIG. 1 is a fragmentary cross-sectional view of a diesel-type internal combustion engine, showing the installation therein of a cylinder head gasket according to the present invention.

Referring to FIG. 1 of the drawing, there is shown an internal combustion engine of the diesel type generally indicated by numeral 10. Engine 10 includes a cylinder block 11 having a pair of banks 12, 13 of axially-spaced, aligned cylinders 14 containing pistons 15. The cylinder block also includes a plurality of oil and coolant passages 16, 18, respectively, which, like the cylinders, open through the upper end wall 20 of the cylinder banks 12, 13.

A cylinder head 22 is mounted on the end wall 20 of each cylinder bank, closing the ends of the cylinders 14 and defining, in conjunction with the pistons 15 and their respective cylinders, combustion chambers 24 in which air-fuel mixtures are periodically compressed and burned for the development of power. Each cylinder head is further provided with oil and coolant passages 26, 28, respectively, which connect with the respective passages 16, 18 of the cylinder block through the flat end wall 20 of the respective cylinder bank and an opposing flat wall 30 of the cylinder head.

Figure 2:
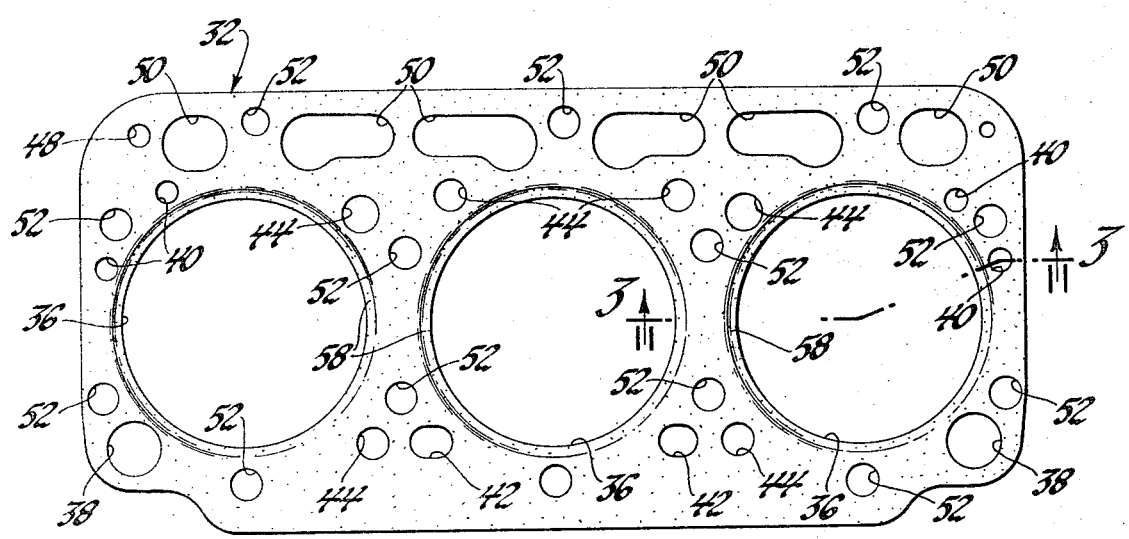
FIG. 2 is a plan view of a preferred embodiment of cylinder head gasket formed according to the present invention.

At the joint between the walls 30, 20 of each cylinder head and the block, respectively, combustion chambers and oil, coolant and other passages which pass therethrough, are sealed by a composite cylinder head gasket generally indicated by numeral 32. In its installed condition, as in FIG. 1, the gasket 32 is compressed to flat condition wherein the opposite sides are parallel. However, in its initial condition, before installation, the construction of the gasket is as illustrated in FIGS. 2 and 3.

Referring to the last-mentioned figures, the cylinder head gasket 32 is seen to comprise a generally rectangular thin sheet-like body having a plurality of large, spaced cylinder openings 36 which, upon installation of the gasket in an engine, are adapted to register with the engine cylinders 15. The gasket also includes a number of variously sized coolant openings 38, 40, 42 and 44, as well as oil pressure and drain openings 48, 50, respectively, and bolt holes 52, all of which register with corresponding openings in the engine cylinder block and head.

Figure 3:
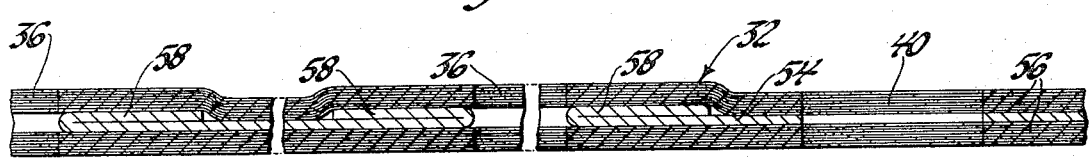
FIG. 3 is a fragmentary cross-sectional view of the cylinder head gasket of FIG. 2 taken generally in the planes indicated by the Line 3—3.

In the cross-sectional view of FIG. 3, it is apparent that the composite gasket is made up of a generally flat metal plate 54, which is coated on its opposite sides by layers of sealing material 56 cemented or otherwise suitably secured thereto.

The flat metal plate 54 may be of any suitable material which will adequately support the sealing material in handling and will provide the necessary degree of formability, as will be subsequently seen. In the specific example illustrated, the plate is formed of hard-tempered copper sheet having a nominal thickness of 0.010 inches. It is of uniform thickness throughout the extent of the gasket body, except for narrow annular portions 58 surrounding the cylinder openings 36, where a part of the sheet is folded back upon itself to form a double thickness for purposes which will subsequently be made clear.

The sealing material 56 is a preferably laminated sheet graphite having a density substantially less than its fully compressed density and preferably about 90 pounds per cubic foot (its fully compressed density being about 125 pounds per cubic foot). Graphite material of this type is commercially available from vendors of carbon products, one such material being obtainable from the Union Carbide Corporation under the trade name "Grafoil."

In accordance with the illustrated construction, the graphite material is applied to the opposite sides of the sheet 54 in suitable thicknesses; for example, of 0.025 inches on either side. Since the coatings are of constant thickness, the portions of the coating which cover the double thickness parts of the sheet in the annular portions 58 surrounding the cylinder openings 36 are raised slightly so that the overall gasket thickness in these annular portions is approximately 0.010 inches greater than the remainder of the gasket.

Upon installation of the gasket of FIGS. 2 and 3 in an engine, as shown in FIG. 1, between the opposing flat surfaces of the cylinder block and head, the tightening down of the head bolts, not shown, to a desired torque compresses the gasket with a predetermined pressure to a thickness somewhat less than its minimum original thickness; for example to about 0.055 inches from a minimum original thickness of 0.060 inches. The amount of compression is such that the portions of the graphite material which lie on opposite sides of the narrow annular portions 58 surrounding the cylinder opening are compressed to substantially their maximum density so that the pores in the material are essentially eliminated. At the same time the remaining areas of the graphite material (outside portions 58) are compressed to a lesser extent, sufficient, however, to provide an adequate seal for the various coolant and oil passages which must be sealed by the gasket.

The compression of the gasket portions 58 surrounding the cylinders to the maximum density of the graphite material provides a seal at this point which is capable of resisting higher cylinder pressures and temperatures without burning than is the case if the gasket material is not so fully compressed. For this reason, the variation in the original thickness of the gasket between the cylinder sealing portions and the remainder of the gasket is necessarily correlated so that the clamping pressure available through bolting the cylinder head to the block is sufficient to compress the annular portions 58 surrounding the cylinders to near the maximum density of the graphite material at these locations. In addition, however, the uncompressed thickness of the annular portions 58 must not be so great that the maximum compression of these portions occurs before the remainder of the gasket is adequately compressed between the flat opposing surfaces of the cylinder head and block to provide adequate sealing of the oil and water passages also sealed by the gasket. Thus, the difference in thickness of the various portions of the gasket is necessarily related both to the original thickness of the graphite coating applied on the gasket surfaces and the compressibility or original density of the graphite material utilized.

Figure 4:
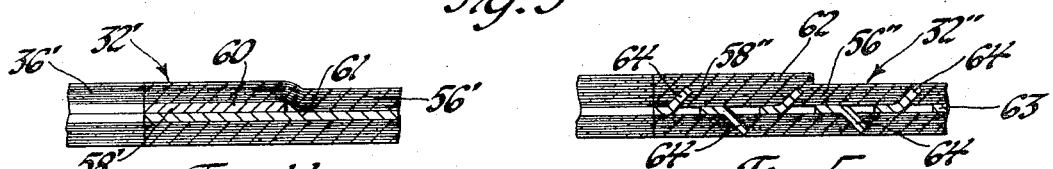
FIGS. 4 and 5 are fragmentary cross-sectional views similar to FIG. 3 but showing alternative configurations for the construction of cylinder head gaskets according to the invention.

FIG. 4 of the drawing illustrates an alternative embodiment of gasket construction 32' in which separate insert rings 60 are applied to the flat metal sheet 61 adjacent the cylinder openings 36' to provide the increased thickness at these annular portions 58', rather than providing folded over portions of the metal sheet itself as in the embodiment of FIGS. 2 and 3.

Figure 5:
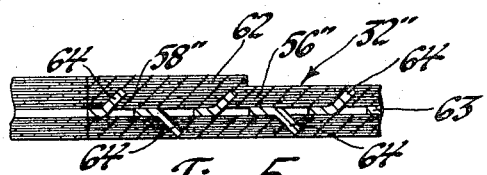

FIG. 5 shows yet another embodiment in which the increased thickness of the annular portions 58" surrounding the cylinder openings is provided by applying additional rings 62 of graphite material to an otherwise flat gasket construction 32". In this embodiment, the metal plate 63 is also provided with a plurality of oppositely directed tangs 64 which are formed from portions of the metal sheet and extend angularly into the graphite coating 56" to assist in securing it firmly in place before assembly.

While the invention has been described by reference to certain preferred embodiments, it should be understood that numerous changes may be made within the spirit and scope of the inventive concepts disclosed. As an example of such changes and without limitation as to others which may be made, it may be noted that the required nearly complete compression of the graphite gasket sealing material surrounding the cylinder bores could be achieved by the use of a flat gasket combined with a raised portion on either or both of the cylinder head and block opposing faces adjacent the cylinder bore openings. In light of the many possible modifications which may be made, it is intended that the invention not be limited except by the language of the following claims.

I claim:

1. A composite cylinder head gasket for an internal combustion engine, said gasket comprising a sheet metal body having a plurality of spaced cylinder openings adapted to register with the engine cylinders and at least one additional opening adapted to register with liquid containing cavities of the engine cylinder block and head, a layer of sheet graphite covering each of the opposite surfaces of said metal body, said graphite having a density less than its maximum and being compressible to approximately its maximum density, said composite gasket having first annular sealing portions surrounding said cylinder openings with edges of said graphite exposed thereto and a second sealing portion surrounding said at least one additional opening with edges of said graphite exposed thereto, said first sealing portions being substantially thicker than the remainder of said gasket but compressible to a thickness substantially less than the uncompressed thickness of said second sealing portion, whereby said gasket may be compressed between opposing flat surfaces to a thickness at which the graphite of said first sealing portions exposed to said cylinder openings approaches its maximum density while the graphite of said second sealing portion is compressed to a substantially smaller extent.

2. A composite cylinder head gasket for installation between flat opposing surfaces of the cylinder head and block of an internal combustion engine to seal the joint against leakage from the engine cylinders and other fluid-containing chambers opening through said flat surfaces, said gasket comprising a generally flat sheet metal body with a coating of graphite sealing material covering each of the opposite surfaces of said sheet metal body, said graphite material having a density not greater than ninety percent (90%) of its fully compressed density, said gasket having a plurality of spaced cylinder openings adapted to register with the engine cylinders and a plurality of additional openings adapted to register with at least one other fluid-containing cavity of the engine, said gasket being of substantially uniform thickness except for narrow annular portions adjacent and surrounding said cylinder openings wherein edges of said graphite are exposed to said cylinder openings, said annular portions being thicker than the remainder of said gasket by substantially less than the amount of compression required to fully compress said annular portions of the gasket.

3. The gasket of claim 2 wherein said coating has a substantially constant thickness along each side of said metal body and said metal body is folded over adjacent said spaced cylinder openings whereby the increased thickness of said annular portions is provided.

4. The gasket of claim 2 wherein said metal body is of substantially constant thickness and said coating is applied with greater thickness on at least one side of said body adjacent said spaced cylinder openings.

5. The gasket of claim 2 wherein the increased thickness adjacent said spaced cylinder openings is provided by additional ring members applied between said metal body and said coating on at least one side surrounding said cylinder openings.

6. The gasket of claim 2 wherein said metal body includes a plurality of locking tines bent outwardly from the main portion of said body and projecting into said coating for improved retention thereof.

7. The combination in an internal combustion engine of a cylinder block having a plurality of spaced cylinders opening through a wall thereof and including interior oil and coolant passages also opening through said wall, a cylinder head mounted on said wall and closing said cylinders, said cylinder head including oil and coolant passages connecting with said block passages through said wall, and a cylinder head gasket compressed between said cylinder block and said cylinder head and sealing the joint therebetween against leakage of fluids from said cylinders and said oil and coolant passages, said gasket being formed at least in part from sheet graphite of less than maximum density before installation and having edges thereof directly exposed to said cylinders, the opposing portions of said cylinder head and said block being related to the construction of said gasket such that upon installation and securing of said gasket in position with a predetermined clamping load, said graphite is differentially compressed, such that in said combination, annular portions of said graphite adjacent said cylinders and exposed to gas pressures and temperatures therein are compressed to substantially their maximum density while the remaining portions of said graphite are compressed a lesser amount but sufficient to provide a seal for said oil and water passages.

* * * * *